United States Patent Office 2,857,400
Patented Oct. 21, 1958

2,857,400
PIGMENT PRODUCTION

Joseph H. Cooper, Hillside, N. J., assignor to E. I. du Pont de Nemours and Company, Wilmington, Del., a corporation of Delaware No Drawing. Application September 19, 1955
Serial No. 535,302

14 Claims. (Cl. 260—246)

This invention relates to an improved process for the comminution of colored pigments to a very small particle size as a result of which the products exhibit satisfactory tinctorial strength.

There are many well known colored organic compounds which are of potential value as pigments, but as commonly prepared, they are in a particle size range of 5 to 20 microns or even larger. On the other hand, it is generally accepted that such products can exhibit satisfactory tinctorial strength as pigments only when their particle size is below about 0.2 micron (preferably below about 0.1 micron).

One example of such products is found in the class of phthalocyanine compounds which exhibit high tinctorial strength and remarkable stability to such deteriorating influences as light, solvents, and various chemicals which may have a deleterious effect on many colored compounds. Although many metallic derivatives of the phthalocyanines are known, only copper phthalocyanine, metal-free phthalocyanine, and certain substituted derivatives of these have achieved any wide scale commercial use.

Another class of colored compounds usually requiring particle size reduction for use as pigments are the vat dyestuffs, which are also valuable because of their resistance to the deteriorating influence of light, chemicals and the like.

Various methods have been employed to effect the desired particle size reduction. The method most widely discussed in the art is commonly called "acid pasting," wherein the crude pigment is dissolved in concentrated sulfuric acid, or similar high strength acid, and then regenerated by precipitation on dilution with water. This method may be considered a chemical method of particle size reduction, since a salt of the pigment is formed, and it is the salt which is soluble in the excess acid. Dilution with water hydrolyzes the salt and regenerates the original pigment. When this process is carried out under suitable conditions of agitation and temperature, a very small particle size is achieved. However, the use of a large amount of concentrated sulfuric or other mineral acid is not attractive because of the cost and the serious problem of waste acid disposal (approximately 10 pounds per pound of pigment).

Various methods of reducing particle size by the application of mechanical energy have also been proposed and have usually taken the form of some type of a grinding operation in a ball mill. For instance, in accordance with U. S. Patent No. 2,402,167, a mixture of phthalocyanine pigment and an inert salt such as sodium chloride is subjected to prolonged grinding in attrition type grinding apparatus. After a suitable aqueous extraction of the salt and other impurities soluble in dilute acid, a very valuable pigmentary form of the phthalocyanine pigment is obtained. This method of salt milling is also applicable to vat dyestuffs and other pigments. In another grinding method shown in U. S. Patent No. 2,556,727 the pigment in suspension in an organic liquid, such as acetone, is ground in a ball mill, followed by removal of the acetone by steam distillation and subsequent extraction of the impurities with dilute acid. Although both of these grinding methods have been successful, they show certain disadvantages. For instance, the reduction of particle size appears to proceed rather slowly, usually requiring over twenty-four hours of grinding. The use and removal of the large amount of salt in the first method are costly and its presence limits the capacity of the mill. The use of the organic liquid introduces an element of hazard in the second method, particularly with respect to the dissipation of the large amount of heat generated in a ball mill.

Many attempts have been made to reduce the particle size of such pigments by grinding them in a dry form without the addition of any added agents, but they have been without success in the past. For instance, when a crude copper phthalocyanine pigment is ground in the dry state in the absence of any added inert substance, there is no evidence of any substantial reduction in particle size when examined by any of the tests usually applied to such pigments. There is no increase in tinctorial strength; rather, it is common to observe a marked decrease in strength. There is no improvement in intensity of color, nor is there any evidence of significantly smaller particle size by either microscopic observation or surface area measurements. These tendencies are particularly serious when the grinding is done in a ball mill; and it has even been observed that a small particle size copper phthalocyanine finished by other methods will revert largely to the properties of a crude pigment when subjected to dry grinding in a ball mill. The effect is not limited to ball mill grinding; it is observed to a lesser degree in other dry grinding methods, such as may be found in a hammer mill or even in a mortar and pestle. In short, all prior experience has led to the presumption that dry grinding is not an effective method for particle size reduction of phthalocyanine pigments.

It is an object of this invention to provide a new and improved method of comminuting crude pigments to a particle size suitable for use as satisfactory tinctorial strength pigments.

It is another object of this invention to provide a process for comminuting crude pigments to a particle size suitable for use as satisfactory tinctorial strength pigments in a comparatively short period of time.

Other objects of the invention will appear hereinafter.

The objects of this invention may be accomplished, in general, by first milling the crude pigments for a comparatively short period of time in the dry state in grinding apparatus having an attrition and shearing action on the pigment, followed by violent agitation of the dry-ground pigment in an inert, non-corrosive organic liquid.

It has now been unexpectedly discovered that, although the products of dry grinding are not valuable in themselves as noted above, such products appear to be peculiarly conditioned so that a small amount of violent agitation in the presence of a suitable organic liquid brings about the required particle size reduction in a very short time. The new and improved process, therefore, comprises a two-step process, the first step being a relatively short period of dry milling, preferably in a ball mill. The second step comprises a period of violent agitation in the presence of a suitable organic liquid, such as acetone. Such violent agitation may be accomplished either by a short ball milling cycle in acetone or, preferably, by passing a slurry of the dry-ground pigment in acetone through a homogenizer or colloid mill.

It is my conclusion that simple dry grinding in apparatus having an attrition or shearing action, such as grinding in a ball mill, roller mill, or edge runner, actually does result in reduction in the size of the ultimate crystallite; however, this reduction is also accompanied by aggregation and/or flocculation so that the effective size is not reduced. In fact, it may actually be greater than it was before the grinding. Hence, it has not been possible to capitalize on the inherently smaller particle size. By superimposing the step of violent agitation in an organic liquid, I am able to de-aggregate and/or deflocculate the pigment with a minimum of work, thus realizing the properties which are functions of the size of the ultimate crystallite.

In the preferred embodiment of this invention, a phthalocyanine pigment is ground in the conventional manner in a ball mill in the dry state for about six hours. After discharge of the dry pigment from the mill, it is slurried in sufficient acetone to give a fluid slurry, which is then passed through an efficient homogenizer. The acetone is removed by a suitable distillation process, and the resulting pigment is given an aqueous extraction with dilute acid and then isolated by conventional means to give a pigment of the desired tinctorial strength and intensity of color.

The following examples illustrate this invention in more detail.

*Example 1*

Eighteen (18) pounds of a copper phthalocyanine pigment containing about 4.5% chlorine (obtained, for instance, by the reaction of a mixture of suitable amounts of 4-chloro-phthalic acid and phthalic anhydride with urea and copper chloride in the presence of an appropriate catalyst and a suitable liquid carrier) is charged to a ball mill of about 60-gallon capacity containing about 1000 pounds of steel shot of about ⅛″ diameter. The mill is rotated at about 70% of the critical speed (the critical speed is that at which the centrifugal force overcomes the force of gravity so that the grinding balls are retained against the outer wall of the mill) for about six hours. The dry powder is discharged from the mill through a suitable screen, and 9 pounds of said powder is thoroughly mixed with about 41 pounds of acetone to form a liquid slurry. This slurry is given two passes through a two-stage homogenizer with the valves set so that the first valve operates at about 500 pounds per square inch (p. s. i.) and the second valve at 5000 p. s. i. The acetone is then removed by steam distillation to give an aqueous slurry of the pigment. This slurry is made strongly acid with sulfuric acid (approximately 5% by weight), heated at about 80° C. for thirty minutes, filtered, washed free of soluble salts, dried, and pulverized. The resulting bright blue pigment is a typical copper phthalocyanine pigment substantially equal in strength to that obtained by grinding forty-eight hours in a ball mill in the presence of sufficient acetone (about 150 parts) to give a fluid slurry. It is also comparable in color, brilliance, and resistance to light, solvents, and other deteriorating influences.

If the dry pigment from the ball mill is extracted with aqueous acid and dried, the resulting product exhibits a very low tinctorial strength, actually inferior to that of the unground product charged to the ball mill. The subsequent treatment of the acetone slurry in the homogenizer results in a very remarkable two- to three-fold improvement in the tinctorial strength in common pigment uses.

*Example 2*

In place of 41 parts of acetone used in Example 1 with 9 parts of pigment, it is possible to use 50 parts dimethyl formamide, or
85 parts tetrachloro-ethylene, or
83 parts carbon tetrachloride, or
68 parts ortho-dichlorobenzene these amounts giving approximately the same volume as the acetone used in Example 1. The pigment may be slurried with any one of these liquids; put through the homogenizer as in Example 1; the liquid removed by steam distillation; and the pigment extracted as in Example 1 to give products substantially similar to that in Example 1.

*Example 3*

Eighteen (18) parts of copper phthalocyanine containing about 4.5% chlorine is ground for about six hours in a ball mill as shown in Example 1. One hundred and fifty (150) parts of acetone is then added to the mill and the rotation of the mill is continued for about six hours (a total milling time of twelve hours) after which the mill slurry is discharged, and the pigment isolated as in Example 1 to give a product having excellent pigment properties; said product being substantially equivalent to the product of Example 1. This method has the advantage of a simpler procedure for discharging the mill, but requires an extra step to dry it out for reloading.

*Example 4*

A copper phthalocyanine substantially free of chlorine is used in place of the chlorine-containing product in the process of Example 1. After homogenization in acetone and isolation of the pigment, a product of good strength is obtained. It is known that chlorine-free copper phthalocyanine may exist in more than one crystal phase and the mechanical action of the dry milling step tends to convert any beta phase which may be present to the alpha phase.

On the other hand, the influence of the acetone will be to convert alpha to beta. Therefore, by this process a product which is a mixture of the two crystal phases is usually obtained, and the ratio of the phases is governed by the conditions of operation. The significance of terms "alpha" and "beta" as used herein is the same as in FIAT Report 1313, vol. 3, page 447, and in U. S. Patent No. 2,556,726.

*Example 5*

Eighteen (18) parts of chlorine-free copper phthalocyanine is ground in a ball mill and then homogenized in acetone as in Example 1, except that 0.4 part of tetrachloro-ethylene is added to the ball mill with the pigment. This is not sufficient solvent to significantly change the dry character of the mill charge, but it does cause the pigment to be converted to the beta phase so that the final product exhibits the greenish blue hue and the high degree of crystal stability characteristic of beta phase copper phthalocyanine.

*Example 6*

Twenty-six (26) parts of a polychloro-copper phthalocyanine (about 47% chlorine—equivalent to the replacement of about 14.5–15.0 of the 16 available hydrogen atoms with chlorine) is charged to a ball mill with 1000 parts of small steel shot as in Example 1. After milling six hours, the dry powder is discharged. Thirteen (13) parts of the powder is mixed with 41 parts of acetone and put through the homogenizer as in Example 1. After isolation of the pigment in the manner of Example 1, a bright green powder is obtained which exhibits substantially the same properties as can be obtained by milling in acetone for about forty-eight hours after the manner of U. S. Patent No. 2,556,727.

Various copper phthalocyanine pigments are known and the new two-step process of this invention has utility with all such pigments. Thus, I may use pure copper phthalocyanine as well as the partially or substantially chlorinated species. The properties of these various forms are well known. Of particular note is the possible existence of two crystal phases in the case of pure copper phthalocyanine, as recognized for instance in FIAT Report 1313, vol. 3, and in U. S. Patent No. 2,556,726. The final crystal phase is frequently influenced by the conditions employed in particle size reduction, and this applies to the present invention as well as to the prior art. The presence of chlorine usually stabilizes the crystal phase, but it may cause a shift in the hue toward the green, and the selection of the pigment to be used in this invention will be guided by the properties desired.

The process of this invention is equally applicable to polychloro-copper phthalocyanine wherein 14 or more of the 16 hydrogen atoms have been replaced by chlorine. This product is a highly useful green pigment which normally is not subject to any phase transformations.

Although the application of this invention to the particle size reduction of copper phthalocyanine has been stressed herein, it is also applicable to the particle size reduction of metal-free phthalocyanine and of other metal derivatives such as nickel phthalocyanine, cobalt phthalocyanine, aluminum phthalocyanine, iron phthalocyanine, and the like, as well as to the corresponding partially chlorinated and more or less completely chlorinated derivatives.

The process of this invention is also applicable to other pigments which require particle size reduction to develop the desired tinctorial strength and other pigment properties. The following examples illustrate such use with other pigments.

Example 7

Seventeen (17) pounds of a crude dioxazine violet pigment (2,9-diphenyl-6,13-dichlorotriphendioxazine) is charged to a 60 gallon ball mill with 1000 lbs. of steel shot and milled for about 6 hours as in Example 1. 9 lbs. of the powder is then mixed with about 41 lbs. of acetone and given 2 passes through a homogenizer as in Example 1. After extraction in dilute acid, filtering and drying, a brilliant violet pigment of excellent tinctorial strength is obtained.

Example 8

Seventeen (17) pounds of a red vat dye pigment in crude form comprising 2,5-di(1'-amino-2'anthraquinonyl)-1,3,4-oxadiazole, which is disclosed in U. S. Patent 2,464,831, is milled in a ball mill and homogenized in acetone as in Example 7 to give a brilliant red pigment of high tinctorial strength.

Example 9

Seventeen (17) pounds of a red quinacridone pigment in crude form comprising quin(2,3b)-acridine-7,14(5,12)-dione is ground in a ball mill and homogenized in acetone as in Example 7 to give a brilliant bluish red pigment of high tinctorial strength.

The three pigments cited in Examples 7, 8 and 9 and the phthalocyanines cited in Examples 1–6 are intended to be illustrative only, and the process is considered to be applicable to many other products in this field.

The preferred method of dry milling is in a ball mill with small shot, i. e., shot having a diameter of 0.1 in. to 0.25 in.; however, any type of milling or grinding apparatus in which the grinding action is due to attrition or shearing action as distinguished from impact action may be used. Grinding apparatus having an impact action, such as a pulverizer or micronizer, produce inferior results. Although any type of ball mill grinding may be effective, the time required for optimum results will vary with such factors as mill loading, size of the grinding balls and the like in a manner well known in the art of ball mill grinding. Rod mills as well as stirred and vibratory types of ball mills in contrast to the usual rotating type are additional examples of grinding apparatus having an attrition or shearing action on the pigment.

The treatment after dry grinding requires a violent and concentrated application of energy in the presence of an organic liquid having a tendency to wet the pigment particles. Any organic liquid which has a wetting action on the pigment particles may be used provided that it is sufficiently volatile to be removed by steam distillation, and that it is inert to the pigment and noncorrosive to the apparatus and grinding elements. A wide variety of organic liquids are suitable, including nitrobenzene; anhydrous alcohols such as methanol or isopropanol; acetone and other common aliphatic ketones; esters such as the monoesters of ethylene glycol; hydrocarbons, and halogen substituted hydrocarbons. The following specific organic compounds have given particularly good results:

Acetone
Dimethylformamide
Tetrachloro-ethylene
Carbon tetrachloride
Ortho-dichlorobenzene The choice of liquid will be influenced by cost, ease of recovery, and hazard of use. The higher boiling liquids are generally more difficult to recover by steam distillation, and some liquids such as nitrobenzene and chlorinated hydrocarbons are quite toxic. On the other hand, the low boiling liquids such as acetone tend to be flammable though low in cost and relatively non-toxic.

The amount of liquid shown in the example is approximately that which will give a slurry containing about 10% pigment by volume. However, the amount of liquid used may vary widely with only minor effects on the resulting product. When the pigment exceeds about 10% by volume of the slurry, the slurry becomes increasingly thick, and a point is reached at about 20% pigment when it is very difficult to pump the slurry through the homogenizer. With decreasing pigment, the slurry becomes thin, and the pigment is not easily retained in uniform suspension. Also the use of such large quantities of liquid offers no advantage and is wasteful. The optimum range of pigment concentration in the slurry put through the agitation apparatus is thus from about 5% to about 20% by volume.

The preferred device for the application of energy in the presence of the organic liquid is a homogenizer. One common form of such device comprises a pump capable of exerting high pressure combined with one or more spring loaded valves on the discharge side of the pump which can be adjusted to give any desired pressure drop across the valve. A common type of valve comprises three circular pieces of metal, one of which is a ring bearing on the surface of the second, these two being held together by a spring on which the tension may be varied, and the third piece of metal being a ring surrounding the first two at their point of contact. The liquid is forced through the space between the spring-pressed annular rings under great pressure and out against the ring surrounding the orifice. It is common to have two such valves in series with a pressure drop of from 500 to 1000 pounds per square inch (p. s. i.) across the first stage and a total pressure drop of from 5000 p. s. i. to 8000 p. s. i. across both valves. However, it is not intended to restrict this invention to any specific piece of equipment. As shown in Example 3, the same end can be achieved by a short ball milling cycle in a liquid such as acetone. It is also contemplated that repeated passes through a colloid mill or any other device giving a violent agitation, high energy shear or impact will accomplish the desired purpose.

The final steps of isolation of the pigment including removal of the organic liquid by steam distillation, extraction with acid, filtration, washing and drying are conventional and are not in any way critical to this invention.

This invention offers a new and potentially low cost method of converting colored pigments to a small particle form useful for all pigmentary purposes. The total time required is much less than is required for a conventional wet ball milling operation or salt milling, and it offers many advantages over acid pasting. The invention is particularly useful in the manufacture of all types of phthalocyanine pigments.

I claim:

1. A process for the comminution of a crude, organic, colored pigment which comprises dry milling said pigment in a milling apparatus having an attrition and shearing action, and then further reducing the particle size of said pigment by subsequently subjecting said dry milled pigment to violent agitation while slurried in an organic liquid slurrying medium that is sufficiently volatile to be removed by steam distillation, is inert to said pigment and apparatus, and has a wetting action on said pigment particles.

2. A process as defined in claim 1 in which said dry milling step is conducted in a ball mill.

3. A process as defined in claim 1 in which said dry milling step is conducted in a ball mill and said agitation step is conducted in a homogenizer.

4. A process as claimed in claim 1 in which said organic liquid slurrying medium is acetone.

5. A process as defined in claim 1 in which the pigment is 2,9-dipheny-6,13-dichlorotriphendioxazine.

6. A process as defined in claim 1 in which the pigment is 2,5-di(1'-amino-2'-anthraquinonyl)-1,3,4-oxadiazole.

7. A process as defined in claim 1 in which the pigment is a quinacridone.

8. A process for the comminution of crude phthalocyanine pigment which comprises dry milling said pigment in a milling apparatus having an attrition and shearing action, and then further reducing the particle size of said pigment by subsequently subjecting said dry-milled pigment to violent agitation, while slurried in an organic liquid slurrying medium that is sufficiently volatile to be removed by steam distillation, is inert to said pigment and apparatus, and has a wetting action on said pigment particles.

9. A process as defined in claim 8 in which said dry milling step is conducted in a ball mill.

10. A process as defined in claim 8 in which said dry milling step is conducted in a ball mill and said agitation step is conducted in a homogenizer.

11. A process as defined in claim 8 in which said organic liquid slurrying medium is acetone.

12. A process as defined in claim 8 in which said phthalocyanine is copper phthalocyanine.

13. A process for the comminution of crude phthalocyanine pigment which comprises dry milling said pigment in a milling apparatus having an attrition and shearing action, suspending said dry-milled pigment in an organic liquid which is a non-solvent therefor and which is sufficiently volatile to be removed by steam distillation, is inert to said pigment and apparatus, and has a wetting action on said pigment particles, and then further reducing the particle size of said pigment by subsequently subjecting said suspension of the pigment in the organic liquid to violent agitation.

14. A process for the comminution of crude phthalocyanine pigment which comprises dry milling said pigment in a milling apparatus having an attrition and shearing action, suspending said dry-milled pigment in an organic liquid which is a non-solvent therefor and which is sufficiently volatile to be removed by steam distillation, is inert to said pigment and apparatus, and has a wetting action on said pigment particles, and then further reducing the particle size of said pigment by subsequently subjecting said suspension of the pigment in the organic liquid to a milling action in a ball mill.

References Cited in the file of this patent

UNITED STATES PATENTS

| | | |
|---|---|---|
| 2,138,413 | Turek | Nov. 29, 1938 |
| 2,486,304 | Loukomsky | Oct. 25, 1949 |
| 2,486,351 | Wiswall | Oct. 25, 1949 |
| 2,556,727 | Lane et al. | June 12, 1951 |
| 2,556,728 | Graham | June 12, 1951 |
| 2,723,980 | Tarantino et al. | Nov. 15, 1955 |
| 2,723,981 | Tullsen | Nov. 15, 1955 |